(No Model.)
R. McKEE.
CEMENT FOR USE IN MANUFACTURING STAINED GLASS.
No. 353,695. Patented Dec. 7, 1886.
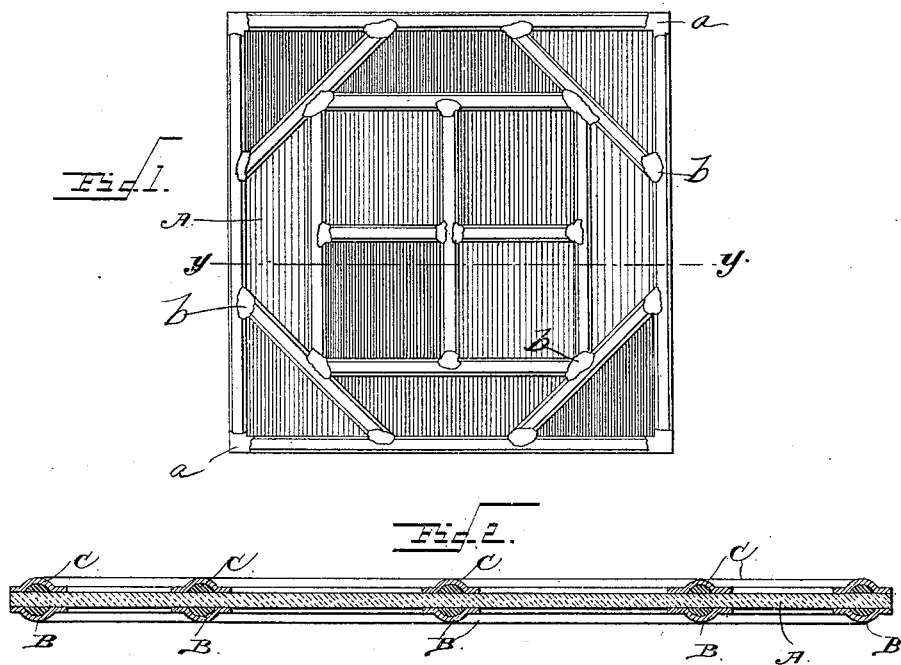

UNITED STATES PATENT OFFICE.

REBECCA McKEE, OF NEW YORK, N. Y.

CEMENT FOR USE IN MANUFACTURING STAINED GLASS.

SPECIFICATION forming part of Letters Patent No. 353,695, dated December 7, 1886.

Application filed June 1, 1886. Serial No. 203,825. (No specimens.)

*To all whom it may concern:*

Be it known that I, REBECCA McKEE, a citizen of the United States, residing at New York, in the county and State of New York, have invented a new and useful Cement for Use in Manufacturing Imitation Stained Glass, of which the following is a specification.

My invention relates to an improved cement; and it consists of the several ingredients hereinafter specified, which are to be compounded in the manner and proportion to be hereinafter particularly set forth and claimed.

The object of my invention is to provide an improved cement for securely and permanently connecting the meeting and lapped ends of the lead strips, which are affixed in any suitable or preferred manner upon the blank or sheet of glass in the manufacture of imitation stained "cathedral" glass.

In the drawings hereto annexed, Figure 1 is a plan view of a sheet or piece of imitation cathedral glass, the lead strips of which are connected by the cement of my invention; and Fig. 2 is a sectional view thereof on the line $x$ $x$ of Fig. 1.

In said drawings, A designates the blank or sheet of glass to which the lead strips B and C are applied and secured by a suitable putty, the said strips being arranged or disposed in any suitable or preferred manner, in accordance with the design or figure which has been previously selected. I do not, however, wish to be understood as claiming this imitation stained glass, as I am well aware that the same is not new; but confine myself to the cement which is employed to securely and permanently connect the meeting ends of the strips B C, or where one strip laps upon the other, as at $a$ $b$. (See Fig. 1.)

My improved cement consists of the following ingredients, to wit: amber, copal, alcohol, powdered glass, ether, and silver-powder.

In preparing this cement for use I take, say, one ounce of amber and copal each, and then add one-half of an ounce of alcohol. These ingredients are then thoroughly mixed by agitation in a suitable vessel, and the powdered glass is then added in sufficient quantity to reduce the mass to the consistency of a thick varnish. About one-half of an ounce of ether is then added, and the entire contents of the vessel are thoroughly commingled together, and finally the silver-powder is added in sufficient quantity and mixed with the other substances to reduce the mixture to a paste. The cement is now ready or in condition for use, and it is applied to the lapped or meeting ends of the strips B C by a suitable implement in the hands of the operator. The ether of the mixture or compound evaporates after it has been properly applied to the strips B C, and the mixture then consolidates and hardens to securely and permanently connect the said strips together.

I have found by experiment that this cement is very efficient and equal to the hot lead that is used to connect the several pieces of stained glass in manufacturing cathedral glass as at present extensively practiced; and the cement is comparatively cheap, as all of the ingredients can be readily obtained of any paint-supply store.

I claim—

The herein-described cement for connecting the meeting and lapped ends of strips in the manufacture of imitation stained glass, consisting of amber, copal, alcohol, powdered glass, ether, and silver-powder, in substantially the proportions specified.

In testimony that I claim the foregoing as my own I have hereto affixed my signature in presence of two witnesses.

REBECCA McKEE.

Witnesses:
A. S. SCHLOSS,
M. PARPART.